United States Patent [19]

Barriere et al.

[11] 3,727,978
[45] Apr. 17, 1973

[54] MECHANISM FOR ADJUSTING THE POSITION AND FOLDING DOWN THE BACKREST OF A SEAT AND A SEAT, IN PARTICULAR FOR AN AUTOMOBILE VEHICLE, INCLUDING SAID MECHANISM

[75] Inventors: Alain Barriere, Montbeliard; Gerard Germain, Hericourt, both of France

[73] Assignee: Automobiles Peugeot, Paris, France and Regie Nationale Des Usines Renault, Billancourt, France

[22] Filed: Apr. 11, 1972

[21] Appl. No.: 242,936

[30] Foreign Application Priority Data

June 11, 1971 France..................................7121244

[52] U.S. Cl..................................297/369, 297/379
[51] Int. Cl. ..................................................B60n 1/02
[58] Field of Search.......................297/353, 354, 366, 297/367, 368, 370, 371, 379; 248/371

[56] References Cited

UNITED STATES PATENTS

| | | | |
|---|---|---|---|
| 2,120,156 | 6/1938 | Simpson | 297/367 |
| 2,286,784 | 6/1942 | Benzick et al. | 297/368 |
| 3,353,868 | 11/1967 | Pigeon et al | 297/378 |
| 3,481,646 | 12/1969 | Tabor | 297/367 |
| 3,576,347 | 4/1971 | Vivian et al. | 297/369 |
| 3,641,838 | 2/1972 | Turner | 297/369 |

Primary Examiner—Francis K. Zugel
Assistant Examiner—Kenneth J. Dorner
Attorney—Robert S. Swecker et al.

[57] ABSTRACT

A mechanism for adjusting in a given range and maintaining in position a foldable backrest relative to a squab of a seat and for backrest the bakrest out of the range of adjustment. The mechanism comprises an intermediate element relative to which the backrest is movable in a guided manner between two extreme positions of adjustment. The intermediate element is movable in a guided manner relative to the squab between the adjusting position and a position remote from the adjusting position. A first locking means integral with a control means is movable in a guided manner relative to the squab between a first position of locking engagement with the backrest and a second position of locking engagement with the intermediate element, the first locking means having an intermediate position for releasing the backrest ad the intermediate element. A second locking means is movable in a guided manner relative to the intermediate element between a first position of locking engagement with the backrest and a second position for releasing the backrest, the second locking means being co-operative with the first locking means so that the second locking means is shifted from its first position to its second position when the first locking means is shifted from its intermediate position to its second position.

17 Claims, 4 Drawing Figures

PATENTED APR 17 1973

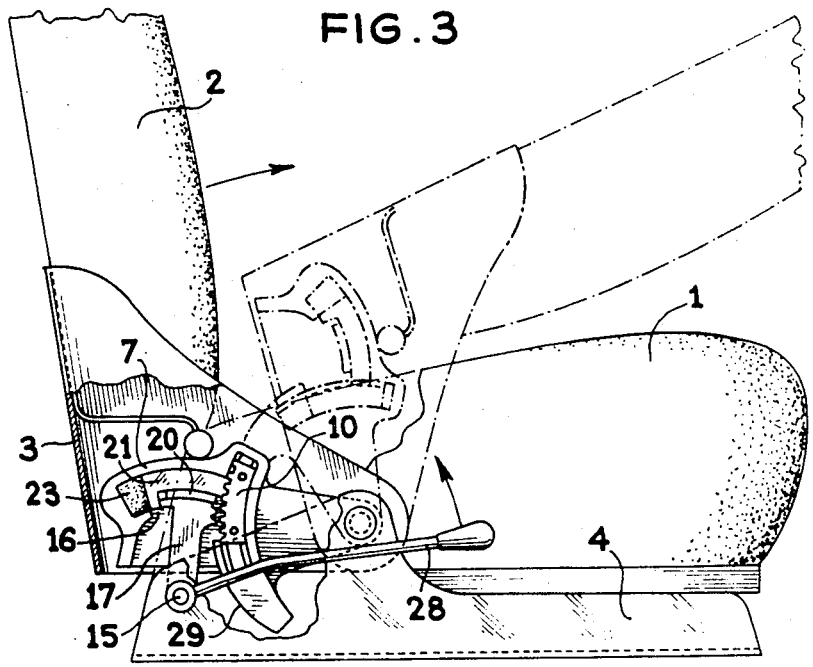
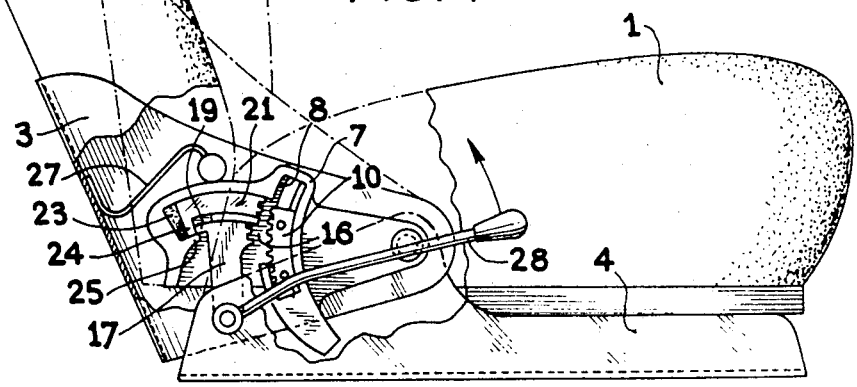

MECHANISM FOR ADJUSTING THE POSITION AND FOLDING DOWN THE BACKREST OF A SEAT AND A SEAT, IN PARTICULAR FOR AN AUTOMOBILE VEHICLE, INCLUDING SAID MECHANISM

The present invention relates to a mechanism for, firstly, adjusting and maintaining in position a movable element relative to a fixed element and, secondly, shifting the movable element at a distance from the region of adjustment with a possibility of returning the movable element exactly to the initial adjusted position.

Various devices are known for this purpose but all of them have two distinct mechanism each of which has control means of which one adjusts the position of the movable element and the other shifts the movable element and returns it to the adjusted position.

These devices are consequently complicated in use owing to the utilization of two distinct control means and expensive owing to the multiplicity of the parts constituting the two mechanisms.

An object of the present invention is to provide a single mechanism which performs the two functions with a minimum number of component parts and a common control means.

The invention provides a mechanism of the considered type which comprises an intermediate element with respect to which the movable element is guided between two extreme positions of adjustment and which is itself guided relative to the fixed element between the adjusted position and the shifted away position, a first locking means integral with a shifting means and guided by the fixed element between a first position locking the movable element and a second position locking the intermediate element with between the two locking positions a position of release in which it releases both the movable element and the intermediate element, and a second locking means guided by the intermediate element between a position locking the movable element and a releasing position, the second locking means being shifted from its locking position to its releasing position under the action of the first locking means when the first locking means moves from its position of release to its second locking position.

In an advantageous embodiment for a movable element mounted to pivot about an axis of rotation on a fixed element, the intermediate element is mounted on the fixed element to rotate about the same axis of rotation.

The invention also provides a seat having a foldable backrest in particular for an automobile vehicle equipped with a mechanism of the type of the embodiment just described, the fixed element being constituted by the squab of the seat and the movable element comprising a member integral with the backrest, the axis of rotation of the movable element and of the intermediate element relative to the fixed element being that of the backrest relative to the squab.

Further features and advantages of the invention will be apparent from the ensuing description with reference to the accompanying drawings.

In the drawings:

FIG. 3 is a side elevational view, with parts cut away, of the mechanism in the folded up position, the backrest being shown in dot-dash line in the folded down position;

FIG. 4 is a view similar to FIG. 3 in which the mechanism is in the backrest adjusting position and the backrest is shown in dot-dash line in another position.

Figure 1:
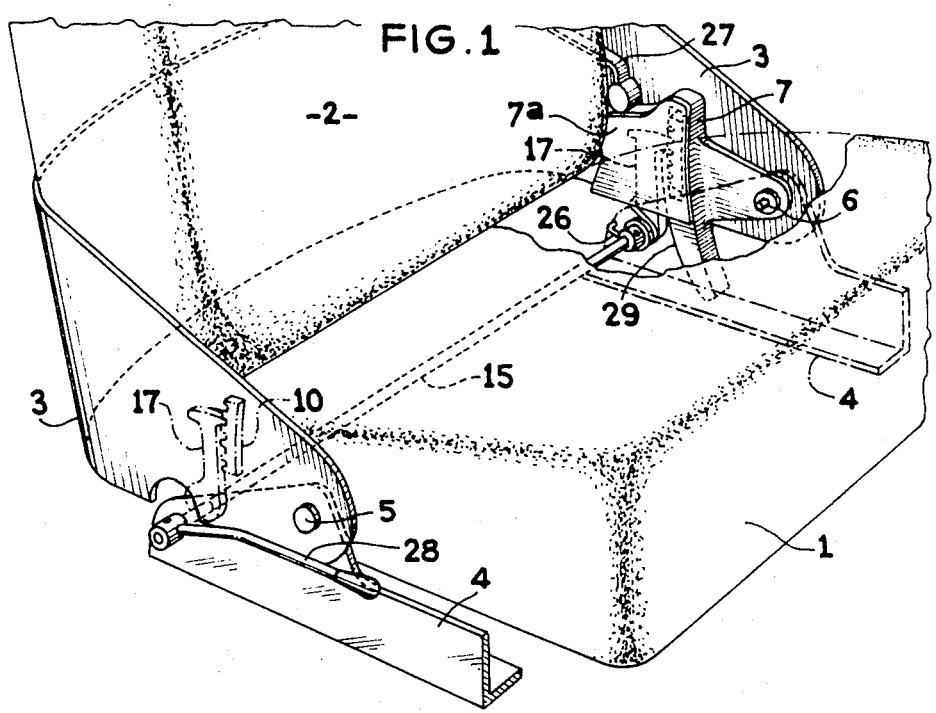
FIG. 1 is a perspective view, with parts cut away, of a seat having a foldable backrest for an automobile vehicle equipped with a mechanism according to the invention, the backrest being shown in the normal raised or folded up position.

In the illustrated embodiment, the seat comprises a seat proper or squab 1 and a backrest 2 which are integral with two lateral vertical side members 3 connected to rotate relative to the frame 4 of the squab by means of two horizontal journals or pins 5 and 6 which are coaxial with a transverse axis and engaged in suitable bearings in the frame. The right pin 5 is directly fixed to the right side member whereas the left pin 6 is rendered integral with the left side member through the medium of an adjusting and folding mechanism.

Figure 2:
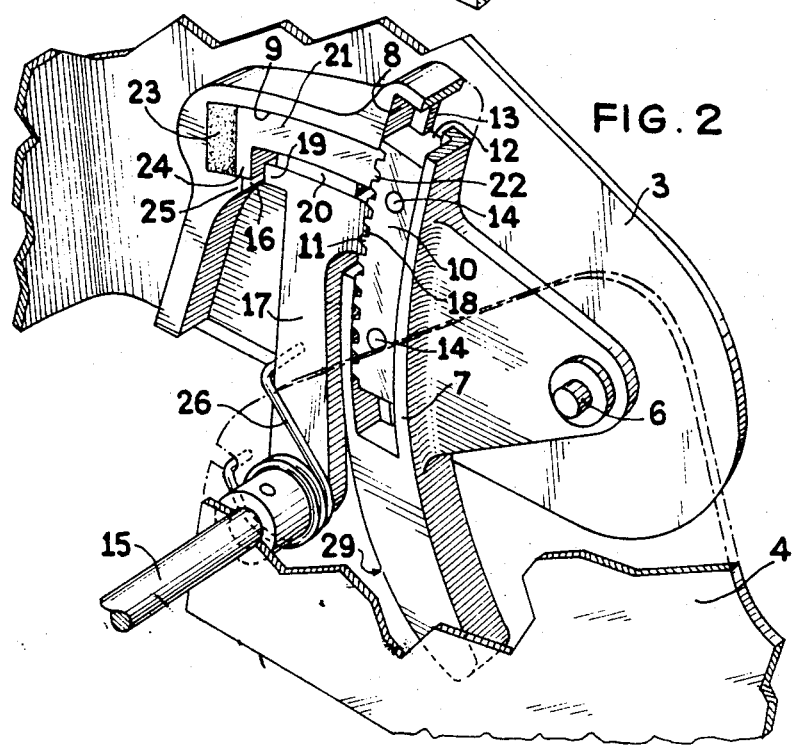
FIG. 2 is a partial perspective view on an enlarged scale of the seat of FIG. 1 showing in more detail the mechanism in the fixed position, its cover having been removed.

The mechanism, which will be described in the normal position shown in FIGS. 1 and 2, is essentially contained in a mean plane which is vertical and longitudinal relative to the seat and has a small size, relative to others, in the horizontal transverse direction of the seat, the thicknesses which are given in this direction to all of its component parts being provided only in order to satisfy the required conditions of strength and facility of operation.

It comprises a case 7 which remains in contact with the side member 3 and which in front carries the inwardly transversely extending pin 6 and at the rear comprises two recesses 8 and 9 the assembly being closed laterally by a cover 7$^a$. The first recess 8 has the general shape of a substantially vertical arc of a circle centered on the axis of the pin 6 and it receives a member 10 in the form of a circular sector which has the same profile as the recess but is shorter than the latter and has teeth 11 on the side thereof remote from the pin and, on one of its sides, a part-circular heel portion 12 which is engaged in a part-circular opening 13 formed in the wall of the case which bears against the side member 3, this toothed sector 10 being fixed by two screws 14 to the side wall 3 through the opening 13.

The second recess 9 also has the general shape of an arc of a circle but is substantially horizontal and centered on the axis of a transverse control shaft 15 which extends across the squab of the seat below the level of the mechanism and is journalled relative to the frame of the squab. The recess 9 opens at its front end into the first recess 8 substantially in the middle of the latter and opens downwardly by way of a passage 16 through which extends a first locking means 17 which is termed hereinafter lock and has a T shape the vertical limb of which is keyed on the shaft 15. One of the arms of the T-shaped lock extends forwardly into the recess 8 and has teeth 18 which mesh with the facing teeth of the sector 10 and its other arm extends rearwardly in the form of a heel 19 disposed inside the recess 9. The upper face of the T-shaped member is in contact with a projecting portion 20 of the case disposed in the middle of the recess 9 in front of the passage 16 and the width of the T-shaped member, from one end to the other of its arms, is slightly less than the width of the passage 16.

The recess 9 also receives above its projecting portion 20 a second locking means 21 which is termed hereinafter a selecting lock and has the general shape of an arc of a circle but is shorter than the recess 9 and has one end portion extending forwardly into the recess 8 and having teeth 22 which mesh with the teeth of the sector 10 above those which mesh with the teeth 18 of the lock 17. The other end portion of the selecting lock 21 extends rearwardly and bears through the medium of a resiliently yieldable member 23 against the end of the recess and has a depending portion 24 which extends below the level of the projecting portion 20 of the case and is in facing relation to the heel portion 19 of the lock 17. The width of the passage 16 is such that when the lock meshes through the medium of its teeth 22 with the sector 10, its portion 24 is still guided in the recess 9, the edge of the passage 16 located on its side constituting a nose 25 whose face adjacent the recess is substantially on the level of the lower face of the heel portion 19 of the lock.

A coil spring 26 under torsional stress surrounds the shaft 15 and one of its end portions bears against the frame of the squab and the other bears against the rear face of the limb of the lock 17 so as to maintain the teeth 18 of the latter in engagement with the sector 10 while the member 23 maintains the teeth 22 of the selecting lock 21 also engaged with the sector 10. A spring strip 27 is disposed above the case 7 with one of its end portions integral with the side member 3, its other end portion carrying a block which bears against the top of the case.

The transverse control shaft 15 carries, at the end thereof located on the right side of the squab, a shifting lever 28 which extends forwardly and permits rotating the shaft 15 about its axis.

The mechanism just described operates in the following manner:

In the position shown in FIGS. 1 and 2 which has just been described, the backrest 2 is maintained in fixed relation to the squab 1 since its side member 3 is integral with the sector 10 which is engaged with the lock 17 and its inclination relative to the squab is determined by the position of the sector 10 inside the recess 8 of the case 7, which position is maintained constant since the selecting lock 21 guided inside the recess 9 of the case 7 is also engaged with the sector 10 so that the case 7 is temporarily rendered integral with the backrest 2. The shifting lever 28 is then in its lowermost position and the lock 17 is maintained by the spring 26 in the forward direction in its normal or first locking position.

In order to fold the backrest 2 forwardly as shown in FIG. 3, the shifting lever 28 is shifted upwardly so that the lock 17 is placed exactly in front of the passage 16 of the case and this releases the sector 10 whereas the selecting lock 21 still remains engaged with the latter. In this position, termed the releasing position, the backrest is free to pivot and shifts the case 7 along therewith. When the backrest is returned to its initial position, the case 7 returns and bears through the agency of its projecting portion 20 on the head of the lock 17 and the latter therefore resumes exactly its preceding position in front of the toothed sector 10. It should be mentioned that the case uncovers only the teeth of the sector corresponding to a single given position. Further, if the lever 28 has been released while the backrest is folded forward, the teeth 18 of the lock 17 are returned to the maximum forward position but, when the backrest is returned together with the case 7, these teeth move slightly rearwardly owing to a camming effect by sliding on a part 29 of the case 7 which extends downwardly from the edge of the passage 16 in the vicinity of the recess 9 of the sector 10 at a distance from the pin 6 which decreases progressively. The teeth 18, after having been urged back by this cam 29, engage the teeth 11 of the sector 10 and this once more results in a locking at the same inclination of the backrest.

In order to adjust the inclination of the backrest as shown in FIG. 4, the shifting lever 28 is once more pulled upwardly but in urging it beyond its preceding position so that the heel portion 19 of the lock 17 urges the selecting block 21, through the medium of its depending portion 24, rearwardly and compresses the member 23 against the case. The lock and the selecting lock are therefore both disengaged from the sector 10 and in this position, termed the second locking position, the case 7 becomes temporarily integral with the squab 1 through the medium of the heel portion 19 of the lock 17 which is then engaged behind the nose 25 of the case. The backrest 2 and the case 7 can then move relative to each other and this permits an adjustment of the inclination between two positions in which the sector 10 abuts one or the other of the ends of the recess 8 of the case, the sector 10 sliding between these two positions inside this recess. The spring strip 27 compensates for the effect of gravity by returning the backrest to the maximum forward position of adjustment (dot-dash line shown in FIG. 4) when the shifting lever 28 is put in the position for adjusting the inclination of the backrest, this spring in no way intervening in the raising of the backrest when the shifting lever has been put in the position for folding the backrest forward.

This mechanism can be employed whenever the backrest of a seat must be both adjustable in inclination and completely foldable forwardly, which is for example the case of front seats of vehicles having only two doors. It may be single as just described or double, the same mechanism being provided, for example, on each side member on each side of the seat but with a single lever 28 for shifting the two locks 17.

A mechanism such as that described hereinbefore may also be provided on a single side, the other side comprising a single side locking device constituted by a lock 17 integral with the control shaft 15 and a toothed sector 10 integral with the side member 3.

Such a mechanism therefore has the advantage of permitting by a single shifting of a single lever:
  the adjustment of the backrest from a mean position;
  the complete folding forward of the backrest so as to clear the way for the passengers occupying the rear seat of the vehicle;
  the return to the position of utilization which occurs with a previously selected inclination, the folding forward of the backrest failing to modify the locked angle of the backrest.

Further, this locking is simple, effective and without play.

Having now described our invention what we claim as new and desire to secure by Letters Patent is:

1. A mechanism for adjusting in a given range and maintaining in position a movable element relative to a fixed element and for shifting the movable element away from the range of adjustment, said mechanism comprising an intermediate element movable relative to the fixed element and movable element, means for guiding the movable element relative to the intermediate element between two extreme positions of adjustment, means for guiding the intermediate element relative to the fixed element between an adjusting position and a position remote from the adjusting position, control means, a first locking means integral with the control means and movable in a guided manner relative to the fixed element for movement between a first position of locking engagement with the movable element and a second position of locking engagement with the intermediate element, the first locking means having between the first position and second position an intermediate position for releasing the movable element and the intermediate element, second locking means movable in a guided manner relative to the intermediate element between a first position of locking engagement with the movable element and a second position for releasing the movable element, the second locking means being co-operative with the first locking means so that the second locking means is shifted from the first position to the second position of the second locking means when the first locking means is moved from the intermediate position to the second position of the first locking means.

2. A mechanism as claimed in claim 1, wherein the movable element is mounted on the fixed element to pivot about an axis of rotation, the intermediate element being mounted on the fixed element to rotate about said axis.

3. A mechanism as claimed in claim 2, wherein the movable element comprises a part-circular ring sector.

4. A mechanism as claimed in claim 1, comprising means for respectively maintaining the two locking means in the first positions of the two locking means.

5. A mechanism as claimed in claim 1, wherein the two locking means are guided in a transverse displacement relative to the displacement of the movable element and intermediate element relative to the fixed element.

6. A mechanism as claimed in claim 1, wherein the first locking means is mounted on the fixed element to pivot about an axis of rotation.

7. A mechanism as claimed in claim 6, comprising a torsion spring disposed between the fixed element and the first locking means so as to bias the first locking means to the first position of the first locking means.

8. A mechanism as claimed in claim 6, wherein the first locking means has the shape of a T and has a limb portion which is pivotable about said axis and two arm portions having locking projecting portions which lockingly co-operate respectively with the movable element and the intermediate element.

9. A mechanism as claimed in claim 1, wherein the movable element is mounted on the fixed element to pivot about an axis of rotation, the intermediate element being mounted on the fixed element to rotate about said axis, the first locking means being mounted on the fixed element to pivot about a second axis of rotation separate from the axis of rotation the intermediate element.

10. A mechanism as claimed in claim 1, wherein the intermediate element is constituted by a case having two recesses in which recesses the movable element and the second locking means are respectively guided.

11. A mechanism as claimed in claim 10, comprising resiliently yieldable means disposed between the second locking means and an end of the corresponding recess toward which end the second locking means moves in moving to the second position of the second locking means.

12. A mechanism as claimed in claim 1, comprising teeth on the two locking means and teeth on the movable element which are engageable by the teeth on the locking means.

13. A mechanism as claimed in claim 1, wherein the intermediate element has a nose portion and the first locking means has a heel portion capable of hooking in the second position of the first locking means on the nose portion of the intermediate element while bearing on a portion of the second locking means so as to cause the second locking means to move from the first position of the second locking means to the releasing position.

14. A seat comprising means defining a squab, means defining a foldable backrest and a mechanism for adjusting the backrest in a given range and maintaining the backrest in position relative to the squab and for folding the backrest away from said range of adjustment, said mechanism comprising an intermediate element movable relative to the squab and backrest, means for guiding the backrest relative to the intermediate element between two extreme positions of adjustment, means for guiding the intermediate element relative to the squab between an adjusting position and a position remote from the adjusting position, control means, a first locking means integral with the control means and movable in a guided manner relative to the squab for movement between a first position of locking engagement with the backrest and a second position of locking engagement with the intermediate element, the first locking means having between the first position and second position an intermediate position for releasing the backrest and the intermediate element, second locking means movable in a guided manner relative to the intermediate element between a first position of a locking engagement with the backrest and a second position for releasing the backrest, the second locking means being co-operative with the first locking means so that the second locking means is shifted from the first position to the second position of the second locking means when the first locking means is moved from the intermediate position to the second position of the first locking means, the backrest being pivotable relative to the squab about an axis of rotation and the intermediate element being pivotable relative to the squab about said axis.

15. A seat as claimed in claim 14, wherein the control means comprises a lever which is pivotable about a second axis, the first locking means also being pivotable about the second axis.

16. A seat as claimed in claim 14, wherein a part of the mechanism consisting of the control means is disposed on one side of the seat and a remaining part of the mechanism is disposed on the opposite side of the seat, a transverse shaft interconnecting said two parts of the mechanism.

17. A seat as claimed in claim 14, wherein said mechanism is disposed on one side of the seat and a third locking means identical to said first locking means is disposed on the opposite side of the seat, a transverse shaft rigidly interconnecting the first locking means and third locking means so that the third locking means is made to lockingly engage the backrest when the first locking means is moved to the first position of the first locking means.

* * * * *